Aug. 20, 1968     H. J. LARRIVEE     3,397,901
BUSHING ASSEMBLY FOR ENGAGING RELATIVELY
RIGID CYLINDRICAL BODIES
Filed Dec. 1, 1966
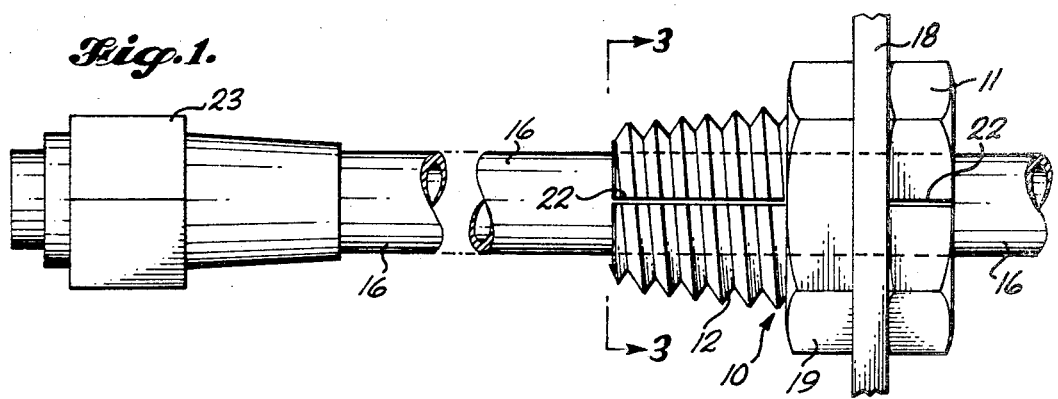
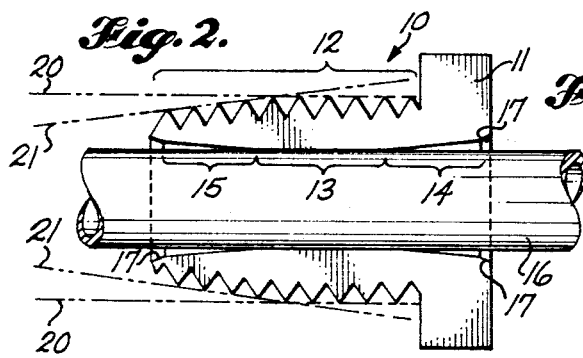
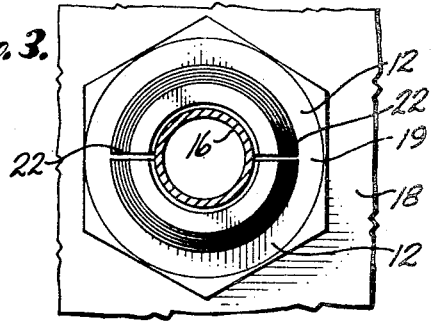
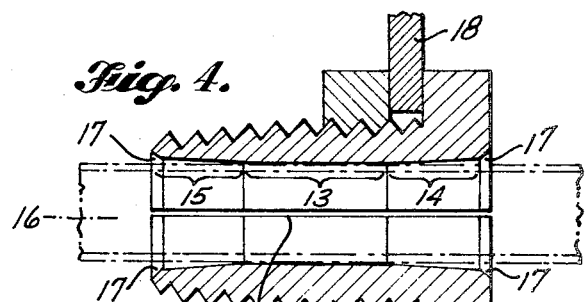
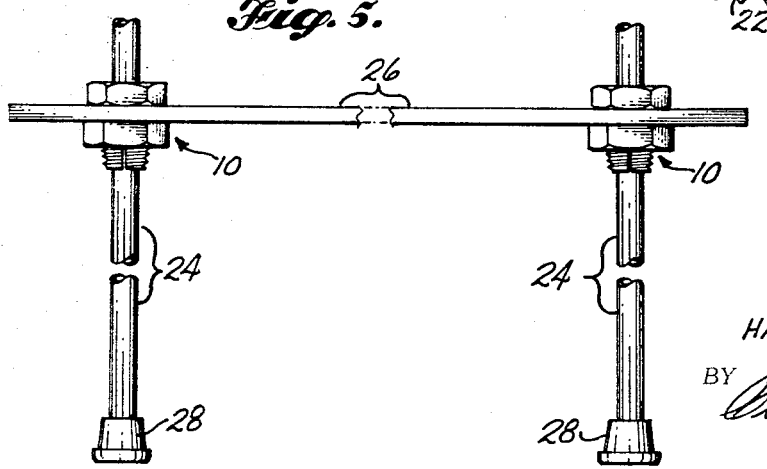
INVENTOR.
HARLAN J. LARRIVEE
BY
ATTORNEY United States Patent Office 3,397,901
Patented Aug. 20, 1968

3,397,901
BUSHING ASSEMBLY FOR ENGAGING RELATIVELY RIGID CYLINDRICAL BODIES
Harlan J. Larrivee, Rte. 2, Box 2117A,
Gig Harbor, Wash. 98335
Continuation-in-part of application Ser. No. 396,562,
Sept. 15, 1964. This application Dec. 1, 1966, Ser.
No. 598,459
2 Claims. (Cl. 285—161)

ABSTRACT OF THE DISCLOSURE

Generally, my invention relates to a bushing assembly for engagement with relatively rigid cylindrical bodies, as tubes or rods, and with predetermined frictional pressure engagement to prevent relative motion in either direction of the bushing assembly as respects the said cylindrical bodies.

---

This application is a continuation-in-part of my co-pending application, Ser. No. 396,562, filed Sept. 15, 1964, and entitled, Bushing Assembly, and now abandoned.

My invention relates to a bushing for connecting relatively rigid cylindrical bodies at locations intermediate their lengths to wall-like supports, such as panels or hangers, having openings therein. Typical relatively rigid cylindrical bodies connected to by devices of my invention are metallic tubes or rods and such examples will be hereafter mentioned as examples, and not as limitations.

Various tubes or rods must be supported intermediate their length by various supports, such as by panels, hangers, brackets, fire walls, bulkheads and the like in automobiles and planes and in many other instances where a tube or rod passes through a support, and such tubes or rods must be rigidly held by such supports. Heretofore the most commonly used expedient utilized to support tubing from supports of the character indicated, employed the step of cutting of the tubing and then the use of common coupling connecters to reconnect the separate tube parts and then the engagement of the coupling connecters with the support. Considerable difficulties obtained in the installing and maintaining of connecters and it is an object of my invention to eliminate the relatively complicated, expensive, and trouble-producing coupler-bracket type supporting fixtures heretofore employed.

Further, my invention relates to a bushing assembly and more particularly to a bushing assembly comprising a plurality of longitudinally mated parts forming when mated, a bushing having a head portion, a shank portion, and in internal longitudinally extending bore.

More particularly my invention relates to a bushing for frictionally engaging tubes or rods of predetermined outside diameter and wherein the bushing bore is mechanically reducible in diameter to a minimum selected in accordance with the predetermined outside diameter of the tubes or rods. In this connection it is to be remembered that standard tubing and rods are made, with reasonable close tolerances, to a given predeterimned outside diameter. Hence, the bushings may be manufactured, with reasonable close tolerances, to have mating minimum internal diameters.

Furthermore, my invention relates to a bushing wherein the character and construction of the bore thereof has in combination a pressure area, which is longitudinally centrally disposed and preferably has a constant diameter, the size of which is selected so that the bushing used for a particular tube or rod has a minimum internal diameter which is slightly less than the external diameter of the tube or rod. Preferably, the said bore of the bushing has terminal tapering portions connected with said pressure area and which increase in diameter as they extend tion tends not in jure the tubes or rods but merely enlongitudinally away from the said pressure area.

Next, my invention contemplates the supporting of tubes or rods which are relatively rigid, such as copper tubing, brass tubing, steel tubing, metal rods, and the like, and wherein the bushing of my invention is as hard or relatively harder than the tubes or rods, so that any deformation is of the tubes or rods and any such deformation tends not to injure the tubes or rods but merely enhance the frictional engagement of the bushing with the tubes or rods.

Next, my invention relates to a bushing wherein the shank portion thereof has two externally threaded portions, one of which has a constant diameter and extends from the head of the bushing at one terminal end portion of the bushing toward the other terminal end portion and to an extent longitudinally over the pressure area of the bore of the bushing and the second of which is tapered and extends from the first mentioned threaded portion to the said other terminal end portion of the shank. The said second externally threaded portion on the shank of the bushing is of a lesser diameter at the terminal end portion of the shank away from the head portion, and the said tapered portion increases in diameter until it reaches the first mentioned threaded portion and both the first and second threaded portions have matching threads to receive the threads of an internally threaded nut.

Furthermore, as an internally threaded nut is turned or is rotated by mechanical means, as a wrench, it rises up the said tapering portion of the second externally threaded portion and an increasing pressure is provided by the pressure area of the bore of the bushing on a tube or rod disposed in said bore. As the internally threaded nut is turned by mechanical means and moves along the first externally threaded portion of the shank of the bushing, then a constant maintaining pressure is provided by the bore of the bushing on the tube or rod.

Thus, when the bushing of my invention is provided with the bore and pressure area, and the inclined and uniform diameter threaded shank portions, an internally threaded nut may be caused to rise up the inclined portion and in response to mechanical advantage obtained by wrench pressure and thus provide pressure to the desired extent and then such pressure is maintained after the threaded nut is continued to be turned along the threaded portion of uniform diameter. If the rod or tube in the bore is relatively rigid, then the extent of pressure increases to be provided may be deterimned by selecting bushings having bore diameters selected for tubes or rods of given outside diameters. Such pressures so determined may be maintained as the internally threaded nut is continued in turning and moves along the area of the shank having a common diameter. By having the bushing selected to have a bore diameter (when at a minimum) only slightly less than the external diameter of the tubes or rods, then there will be little, if any, compression of the rod or tube and the extent of frictional engagement pressure between the bushing and tube or rod may be predetermined by selection of bore diameters of bushings for a particular size of tube or rod.

Generally, it is desirable to rigidly support tubes and rods which pass through supports to minimize problems resulting from wear, heat, and vibration. Thus, my invention is designed particularly to take care of problems in connection with rods or tubes passing through fixed supports and to which the rods or tubes are to be frictionally engaged and with the desired frictional pressure engagement Many tubes employed in modern day automobiles, trucks, and planes carry therein relatively high pressures of fluids (both liquid and gas) and it is highly desirable to maintain relatively high frictional engagement between such tubes and their supports to minimize problems resulting from relative motion between the tubes and the bushings and also between the bushings and the supports.

Another feature of my invention is the ease of installation of rods or tubes in an environment where the construction is otherwise complete except the installation of such rods or tubes. For example, holes may be selectively positioned in bulkheads, or other supports, and after the construction is otherwise complete, the tubes or rods may be passed through such holes and through nuts, positioned on the tubes or rods or temporarily held by the supports, as the tubes or rods are passed through the supports. Thereafter, my two-part bushing may be installed by moving the two parts sidewise and into longitudinal registration over the tube and then threadedly engaging the internal threads of the nut with the external threads on the bushing, thereby frictionally engaging the bushing with the tube and supportingly engaging the bushing with the supports through which the tubing passes.

Another characteristic of my invention is that the metallic bushings thereof are readily subject to mass production by well-known methods and provide a multi-purpose bushing formed of mating parts.

Other objects and advantages of my invention will be apparent from the following description, appended claims and annexed drawing.

Referring to the drawing, wherein like reference numerals indicate like parts throughout the several views, it will appear:

FIG. 1 is a fragmentary elevational view, with parts broken away, of an embodiment of my invention, illustrated in connection therewith, a tubular member supported by a device of my invention to a fragment of a fixed wall or bracket;

FIG. 2 is a side elevational view of one of the two bushing parts of my invention shown in FIG. 1 and with a fragment of a piece of tubing shown in place;

FIG. 3 is a fragmentary view taken substantially on broken line 3—3 of FIG. 1;

FIG. 4 is a longitudinal sectional view showing my invention (in connection with a tubular member shown in phantom) and with the parts in substantially the same relative rotational position as shown in FIG. 1 of the drawing; and FIG. 5 is an elevational view showing an illustrative embodiment of the use of my invention in connection with other cylindrical bodies, such as rods.

Referring now more specifically to the drawing, the bushing 10 comprises a plurality of longitudinally mated parts and as a preferable illustration thereof and not a limitation, I have shown two bushing parts. Each part has a head portion 11 and a shank portion 12. When the two mated portions are arranged as illustrated in FIGS. 1 to 4 of the drawing, an internal longitudinally extending bore is provided having a pressure area 13, which is preferably centrally disposed longitudinally and is of a constant diameter. The said bore has a terminal portion 14 and a terminal portion 15, which are tapered portions and have diameters which increase as said tapered portions extend away from the pressure area 13.

The longitudinal extent of the pressure area 13 will depend upon the amount of pressure-friction desired in contact with a tube or rod. The minimum diameter of the pressure area (said minimum being determined as that when the two parts are urged toward each other the maximum amount by nut 19) is selected in accordance with the outside diameter of the tube or rod to be engaged. That is, I will use one size of bore diameter of my device for each size of tube or rod. For example, if a rod or tube having an external diameter of ⅜″ is to be frictionally held by a device of my invention, the said minimum diameter should be slightly less than ⅜″. This will provide sufficient frictional engagement and pressure between my device and relatively rigid tubes or rods to secure my device to the same and to avoid undue deformation of my device, when my device is constructed from material of no less hardness than that of tubes or rods formed of the usual materials therefor, as steel, brass, copper, or the like. I rely on matching the size of the bore (when at a minimum) of my device to each size of tube or rod to be held and the pressure generated utilizes desired mechanical advantage through nuts and wrenches to urge the said bore of my device against a relatively noncompressible tube or rod to provide the necessary friction in securing my device to such a tube or rod.

In view of the fact that the bushing of my invention comprises a plurality of separable longitudinally mated parts, the said parts can be moved laterally into place over a tube or rod and with such tube or rod passing through the bore of bushing 10. Also, each end portion of the longitudinal bore has terminal portions eased or ground away for easing or eliminating corner pressure areas at the terminal ends of the bore on a tube or rod, as tubular member 16, and such eased away portions are indicated at 17 on both ends of the bushing of my invention.

The overall length of a bushing from its head portion 11 to its other terminal end portion will depend not only upon the length of pressure area desired, but upon the thickness of the wall or bracket or support 18, to which the bushing member is secured and the thickness of such walls may vary from portions of an inch in thickness to many inches as other mechanical requirements necessitate. In other words, bushings of my invention may be employed in connection with relatively thin supporting brackets or fire walls in connection with automobiles or in connection with relatively thick bulkheads.

When mated, the bushing of my invention is provided with external threads to provide an external first threaded portion of common diameter, which is generally indicated by the phantom line 20. Also, the shank portion is provided with an external terminal second threaded portion, which is tapered, as indicated generally by the phantom line 21. The first threaded portion 20 and the second threaded portion are thread mated so that both interfit the threads of an internally threaded nut 19. There is, of course, a relatively loose fit when the internal threads of the nut 19 first engage with the threads of the bushing 10 in the inclined or tapered area portion 21. As nut 19 is turned or rotated in the appropriate direction in response to a mechanical pressure obtained by a wrench engaging head 11, the nut 19 climbs up the taper 21 in moving in a direction toward the head 11. There is a resulting gradual increase of pressure of the bore in the bore area 13 of the bushing against tubular member 16 until the bore area decreases to its minimum diameter. When the nut 19 reaches the area 20, the pressure created will be maintained and a sustaining pressure is provided and maintained as the nut 19 travels along the threaded area 20 and is moved toward the head 11.

The bushings of this invention will be made to provide bore sizes, each to interfit or to be used with each standard size diameter of a tube or rod, as the tubular member 16. The minimum size of the bore at the pressure area 13 of a bushing 10 for a particular outside diameter of a tube or rod will thus become apparent by the description of the size of a bushing 10 for a particular size rod or tube. Thus, if for example, the O.D. of a tubular member 16 is ⅜″, then the arc of the diameter of the bore at 13 of the appropriate bushing 10 will have a diameter of ⅜″ and is preferably slightly less than such diameter to provide for a predetermined maximum frictional engagement pressure between the pressure area 13 and the outside of a tubular member 16. The bore size of pressure area 13 is determined to be at its minimum when the two parts of shank 12 are closest and nut 19 is engaged with shank threads 20.

If the two parts forming the shank 10 and head 11 are cast, then the diameter of the pressure area 13 of the bore of the bushing is determined to be slightly less than the outside diameter of the rod or tube which the bushing is designed to fit. If, on the other hand, the bushings are machined, then the bushing is formed from one piece comprising the shank 12 and the head 11 and threads 21 and 20 are then cut on the external surface of the shank 12. Then the bore is provided with the portion 13 having a diameter substantially identical with the outside diameter of the rod or tube which the bushing will fit. Then next the tapered portions 14 and 15 are provided. Thereafter, the one piece so formed may be cut by a metal saw with a longitudinal cut (as kerf or slot 22) so that the one part is severed to form two pieces and the two longitudinally mating parts are provided.

The taper illustrated by the line 21 is in the nature of about 3″ per foot. The type of threads on the shank 12 may be 10 pitch U.N.C. These and other sizes and dimensions given in association with the example chosen are merely illustrative and not limiting.

Also, preferably a kerf or slot 22 is provided between the two members forming the bushing 10 and the said slot should not exceed about 1/8″ to obtain maximum advantage of this invention and preferably the amount thereof should be about 1/32″. Such slot will ensure that all pressures created by threading of the nut 19 on the threads 20 and 21 of the shank 12 of the bushing 10 will be utilized and not arrested by premature contact between the members forming the bushing 10.

In FIG. 1. the tubular member 16 is frictionally and rigidly engaged by the bushing 10 and said bushing 10 is, in turn, rigidly secured to a support 18 by engaging said support 18 between the head 11 and the nut 19. Also, by way of illustration in FIG. 1, the tubular member 16 connects with appropriate other equipment, such as a common coupling 23 shown to the left in FIG. 1 of the drawing.

In FIG. 5 of the drawing I have shown the coupling 10 of my invention utilized in an environment involvings rods 24. Thus, for example, if it is desired to use rods or tubes, as rods 24, as a support for a platform or table 26, the bushings 10 of my invention may be used. Thus, I have indicated rods 24 supported by base members 28 and which rods 24 are, in turn, connected with a platform or panel 26 through the coupling members 10 of my invention.

The bushing member 10 of my invention exerts a force on a tube or rod disposed within the bore of the coupling member, which force is similar to that applied on a drill bit shank by a conventional drill bit chuck. While the means of applying the pressure varies with my invention over such ordinary chuck, the pressures obtaining are substantially in the same order of magnitude and the frictional engagement is substantial. By the use of an appropriate size wrench in turning the nut 19, there are few practical limitations on the pressures available at the pressure area 13 against the external surface on the tube or rod disposed in the bore of my bushing.

In installations having a plurality of spaced apart supports 18 having spaced openings therein, tubing, such as 16, may be installed with great ease. Nuts 19 may be temporarily supported (as by spot welding) by such hangers 18 and with the openings through the nuts 19 alined with the openings through the supports 18. Then the tubing may be passed through spaced openings and through alined nuts. If the nuts are not temporarily supported by the supports 18, the said nuts 19 may be placed on the tubing and on the appropriate side of a support 18 as the tube 16 is passed through the spaced openings. Thereafter, the two parts of my bushing may be moved sidewise into place and into longitudinally alined relationship and then the nut 19 relatively screwed or threaded along the threads 21 and 20 on the shank 12 of the bushing. Thus, my bushings may be readily put in place and properly tightened to secure the bushing 10 frictionally to the tubing 16 and then to secure the bushing 10 to the support 18 by having the head 11 of the bushing 10 on one side of the support 18 and the nut 19 on the other side of said support 18. As the nut 19 is urged against the support 18, desired and predetermined pressure can be created to rigidly secure the bushing to the support 18.

Obviously, changes may be made in the forms, dimensions, and arrangements of the parts of my invention without departing from the principle thereof, the above setting forth only preferred forms of embodiment of my invention.

What is claimed is:

1. An assembly comprising a plurality of longitudinally mated and relatively rigid parts forming, when mated, a bushing having a head portion, a shank portion, and an internally longitudinally extending bore, said bore having a single internal cylindrical pressure area frictionally contacting and providing pressure on the external surface of a relatively rigid cylindrical body member, said body member having predetermined diameter, having a diameter substantially equal to the diameter of the cylindrical pressure area, and being substantially free from deformation by said bushing, said single internal cylindrical pressure area comprising a centrally disposed pressure area of a constant diameter and terminal tapering portions of increasing diameters connected with said area of constant diameter and extending to substantially the terminal ends of said bushing; a first externally threaded portion of substantially constant diameter on the shank of said bushing and extending in length from said head past said pressure area of said bore; a second externally threaded portion on said shank extending from the terminal end portion of the shank away from said head portion to said first threaded portion, of lesser diameter at said terminal end portion, tapering and increasing in diameter until reaching said first threaded portion, both said first and second threaded portions having threads matchingly receiving an internally threaded nut; an internally threaded nut threaded over said second externally threaded portion and providing on said cylindrical body member in said bore at said pressure area a gradually increasing pressure as said nut is turned to rise up said tapering portion of said second externally threaded portion, and providing a constant maintaining pressure at said pressure area as said nut is turned to move along said first externally threaded portion and over said pressure area of said bore, said pressure being of such magnitude to provide sufficient friction to retain said body member within said bushing without deforming the body member; and a wall-like support having an opening therein, slidably receiving in the opening therein, the shank portion of said bushing, said bushing being positioned with one face of the support abutting the head portion of the bushing, and positioned with the internally threaded nut turned to urge with pressure against the other face of said support.

2. The combination of claim 1, wherein the plurality of longitudinally mated parts is two and said two parts are spaced apart by an amount less than 1/8″.

References Cited

UNITED STATES PATENTS

| | | |
|---|---|---|
| 1,827,615 | 10/1931 | Rosenberg. |
| 2,530,258 | 11/1950 | Marsan. |
| 2,952,730 | 9/1960 | Simonds. |
| 3,065,004 | 11/1962 | Laich. |
| 3,148,899 | 9/1964 | Grinstead. |

EDWARD C. ALLEN, *Primary Examiner.*

D. W. AROLA, *Assistant Examiner.*